United States Patent [19]
Heidmann et al.

[11] Patent Number: 6,057,833
[45] Date of Patent: May 2, 2000

[54] METHOD AND APPARATUS FOR PROVIDING REAL TIME ENHANCEMENTS AND ANIMATIONS OVER A VIDEO IMAGE

[75] Inventors: Tim P. Heidmann, Los Altos; Patrick Wade Olsen, Mountain View; Thant Tessman, Granada Hills, all of Calif.

[73] Assignee: Shoreline Studios, Mountain View, Calif.

[21] Appl. No.: 08/835,291

[22] Filed: Apr. 7, 1997

[51] Int. Cl.[7] .................................................. G06J 15/70
[52] U.S. Cl. ..................... 345/328; 345/425; 345/115; 345/474
[58] Field of Search ...................... 345/435, 113, 345/115, 116, 352, 354, 173, 473, 475, 241, 243, 474, 327, 328; 348/578, 589, 722

[56] References Cited

U.S. PATENT DOCUMENTS

| | | | |
|---|---|---|---|
| 4,138,726 | 2/1979 | Girault et al. | 345/113 |
| 5,046,026 | 9/1991 | Tolomei | 364/521 |
| 5,455,902 | 10/1995 | Ellson et al. | 345/473 |
| 5,523,791 | 6/1996 | Berman | 348/584 |
| 5,568,167 | 10/1996 | Galbi | 348/589 |
| 5,579,057 | 11/1996 | Banker et al. | 348/589 |
| 5,867,166 | 2/1999 | Myhrvold | 345/419 |

OTHER PUBLICATIONS

Harvard Graphics Draw, Software Publishing Corp., Section 15, pp. 18–19, Jun. 1990.

*Primary Examiner*—Victor R. Kostak
*Attorney, Agent, or Firm*—Ritter, Van Pelt & Yi LLP

[57] ABSTRACT

A system and method for providing enhancements to a video image is disclosed. The method includes displaying a sequence of video images on a video display. A set of glyphs is provided in connection with the display. The glyphs include predefined graphical images suitable for enhancing the video display. A glyph is selected that is to be combined with the sequence of video images and an insertion point for the glyph on the video display is defined. A video output is generated that contains graphical output information determined by the selected glyph. The relative screen location of the graphical output information is determined by the insertion point of the glyph so that the video output is generated according to the glyphs which are inserted in connection with the sequence of video images.

8 Claims, 12 Drawing Sheets

METHOD AND APPARATUS FOR PROVIDING REAL TIME ENHANCEMENTS AND ANIMATIONS OVER A VIDEO IMAGE

BACKGROUND OF THE INVENTION

1. Field of the Invention

The present invention relates generally to methods and apparatuses for providing computer generated illustrations over a video image in real time. More specifically, the invention relates to methods and apparatuses for generating graphic images over video based on selections made by a user taking advantage of a special interface that enables the graphics to be generated quickly during the course of a live television broadcast.

2. Description of the Related Art

The value of a live television broadcast can be increased greatly by incorporating live graphics illustration, usually with a digital painting application which allows the announcer to draw lines and symbols which appear over a live or videotaped image. Such a digital painting application is commonly known as a Telestrator®. This allows an announcer to describe a complex play in a sporting event, detail some weather phenomenon on a map, or to highlight some aspect of a news video. By augmenting what can be shown by camera alone, these graphics greatly increase the viewer's understanding and enjoyment of a televised event.

The current technology for doing this illustration has several limitations. First, the quality of the appearance of the graphics is very poor, especially compared to the excellent titles and animation typically used in a major broadcast. The lines are shaky, jagged, often show corners in what should be smooth curves, and their appearance is usually limited to a single solid color. Second, it is very difficult for an announcer to draw the complex diagram that he has in mind while talking and under the pressure associated with a live broadcast. Graphics produced under such conditions are frequently misplaced, incomplete, awkwardly shaped, and difficult to decipher. Third, what is often required to present an idea is the ability to create a simple animation, to show for example how a sports play develops, and a static paint system is incapable of generating animation. Finally, it is often useful once a diagram or animation is created, to be able to look at it from several angles in three dimensions (3D), and a paint system is limited to displaying the drawing strokes in two dimensions (2D) as they are generated on the screen.

These limitations are a result of the limited capabilities of current telestrator technology that simply provides a bit mapped input from a touch screen over video. In order to address these problems, what is needed is an improved system for generating graphics over a video image. Specifically, an interface is needed that would enable graphics to be generated very quickly in real time while an announcer is describing a play or replay. A system is needed for quickly transforming rough input from an announcer or other user into high quality graphics that appear on the screen in a manner that is dynamic. It would further be useful if the system could facilitate the fast creation of animations, and if those animations could be synchronized to a video playback. It would also be useful if generated diagrams could be reoriented in three dimensions, so that they could be transferred to views at different camera angles. Finally, if sound effects or predefined graphic enhancements could be added to the animations, the entertainment value of the display could be enhanced.

SUMMARY OF THE INVENTION

Accordingly, the present invention provides an apparatus and method that allows an entirely new approach to creating live and near-live graphics for television illustration. A special interface is provided that allows the graphics creation process to be streamlined, so that real time graphics are easily generated by an announcer. The quality of the graphics is enhanced by a graphics filtering system that smoothes lines, adjusts width, and provides texture as desired. In certain embodiments, some or all of the graphics, including animations are created on a separate workstation in real time, or during brief pauses such as commercial breaks so that high quality animations may be provided for instant replays that are then modified and played back immediately. In some embodiments, the playback of the graphics is synchronized with the videotape playback. In some embodiments, the playback of a graphical animation can trigger outside events, such as video effects or sounds. Animation and static graphics are generated in 3D in certain embodiments, so that they may be viewed from different camera angles. Together, these features provide a powerful unified system for enhancing video presentations.

It should be appreciated that the present invention can be implemented in numerous ways, including as a process, an apparatus, a system, a device, a method, or a computer readable medium. Several inventive embodiments of the present invention are described below.

In one embodiment, a method of providing enhancements to a video image is disclosed. The method includes displaying a sequence of video images on a video display. A set of glyphs is provided in connection with the display. The glyphs include predefined graphical images suitable for enhancing the video display. A glyph is selected that is to be combined with the sequence of video images and an insertion point for the glyph on the video display is defined. A video output is generated that contains graphical output information determined by the selected glyph. The relative screen location of the graphical output information is determined by the insertion point of the glyph so that the video output is generated according to the glyphs which are inserted in connection with the sequence of video images.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Figure 1:
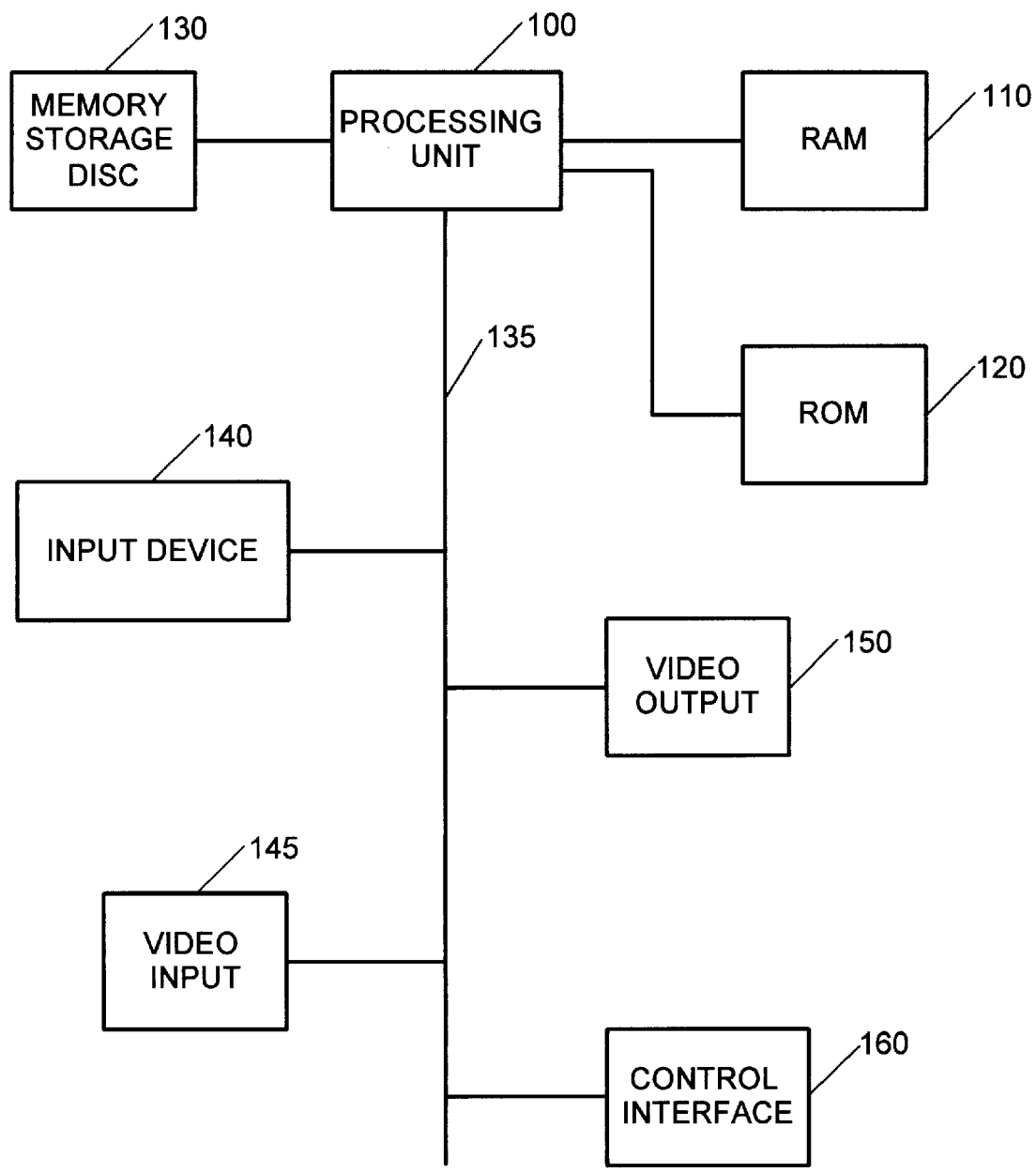
FIG. 1 is a block diagram illustrating a typical computer system on which the present invention may be implemented.

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The various embodiments of the present invention incorporate several features which address the problems described above and together provide a much more powerful environment for the live generation of graphics to augment a telecast. In one embodiment, raw drawing strokes are processed and filtered to produce smooth, unbroken lines and shapes. In another embodiment, the strokes are represented internally by their geometric description, rather than just by pixels in a frame buffer. This allows strokes to be erased, repositioned, or reshaped after they have been drawn. It also allows for extensive control of the look of the graphic, in that it allows anti-aliasing or smoothing the edges of the line. The width of the stroke can also be adjusted, even within a single stroke, and textured looks can be applied to the line to simulate chalk, paint, or a wide range of looks. In addition, depth can be added to give the stroke a 3D appearance. Predefined symbols made up of predefined strokes are also provided. This allows predrawn elements to be incorporated into the presentation, such a professional-looking text, animations, or symbols. In addition, video clips or sound effects can be included as well. These can be created just by touching the screen where they are to appear.

In other embodiments, strokes are recorded in memory and can be replayed at the press of a button, allowing a user to draw precisely the graphic he wants, erasing and changing it until it is exactly right, then produce that drawing again on air by pressing a button to step through it. The strokes are animated, so the impression to the viewer at home is that the announcer is actually drawing the graphic live. The video enhancement system allows the drawn shapes to be further animated after they appear either by saving successive example locations for a shape, by dragging each shape by hand and recording its motion, or by specifying a starting and ending point. Objects can change shape, color or other attributes as they are animated. Complex layered animations can be built up by moving one shape at a time, then the entire animation can be played back at the touch of a button.

Since strokes or predefined symbols are saved internally as geometry, they can be drawn or animated from any angle of view, so the same animation of a football play can easily be viewed from overhead, from a seat on the fifty yard line, from the end zone, or from a quarterback's point of view. The video enhancement system also has the ability to draw directly onto 3D surfaces viewed in perspective on the screen, so that the user can draw, then move the view, then draw again, etc. It is also possible to tie the 3D motion of the graphics to a video camera, so that as the camera moves back and forth, the graphics move in sync and appear to be painted onto the scene.

FIG. 1 is a block diagram illustrating a typical computer system on which the present invention may be implemented. A processing unit 100 is connected to RAM 110 and ROM 120. Processing unit 100 is also connected to a memory storage disk 130. Processing unit 100 is a also connected to an I/O bus 135. I/O bus is connected to an input device 140. Input device 140 is preferably a touch screen on which a user may trace diagrams or sketches over a video image that is shown on the screen. Input device 140 may also include a keyboard, trackball, a knob used to advance or stop or rewind a video tape or graphic animation, a mouse , stylus, or other pointing device. A video input 145 is connected to I/O bus 135. Video input 145 provides an external time reference that enables graphics to be synchronized with a videotape. A video output 150 is provided to output the graphics generated by processing unit 100. Video output 150 may be connected to a video keying device that combines the video output signal with a signal from videotape or a camera. The signal from a video output 150 is thus mixed or combined with other video that is enhanced by the graphics generated by the user with input device 140. For example, in one embodiment the video output includes the graphics generated by the user combined with the video shown to the user on the touch screen. This output is sent to the touch screen and is also broadcast so that the user sees exactly what is going over the air. A control interface 160 is provided for so that animation can be controlled by commands from an external video tape machine. Alternatively, in certain embodiments, commands are sent from processing unit 100 to an external videotape machine. In either case, video playback is synchronized to the generated graphics display.

Figure 2:
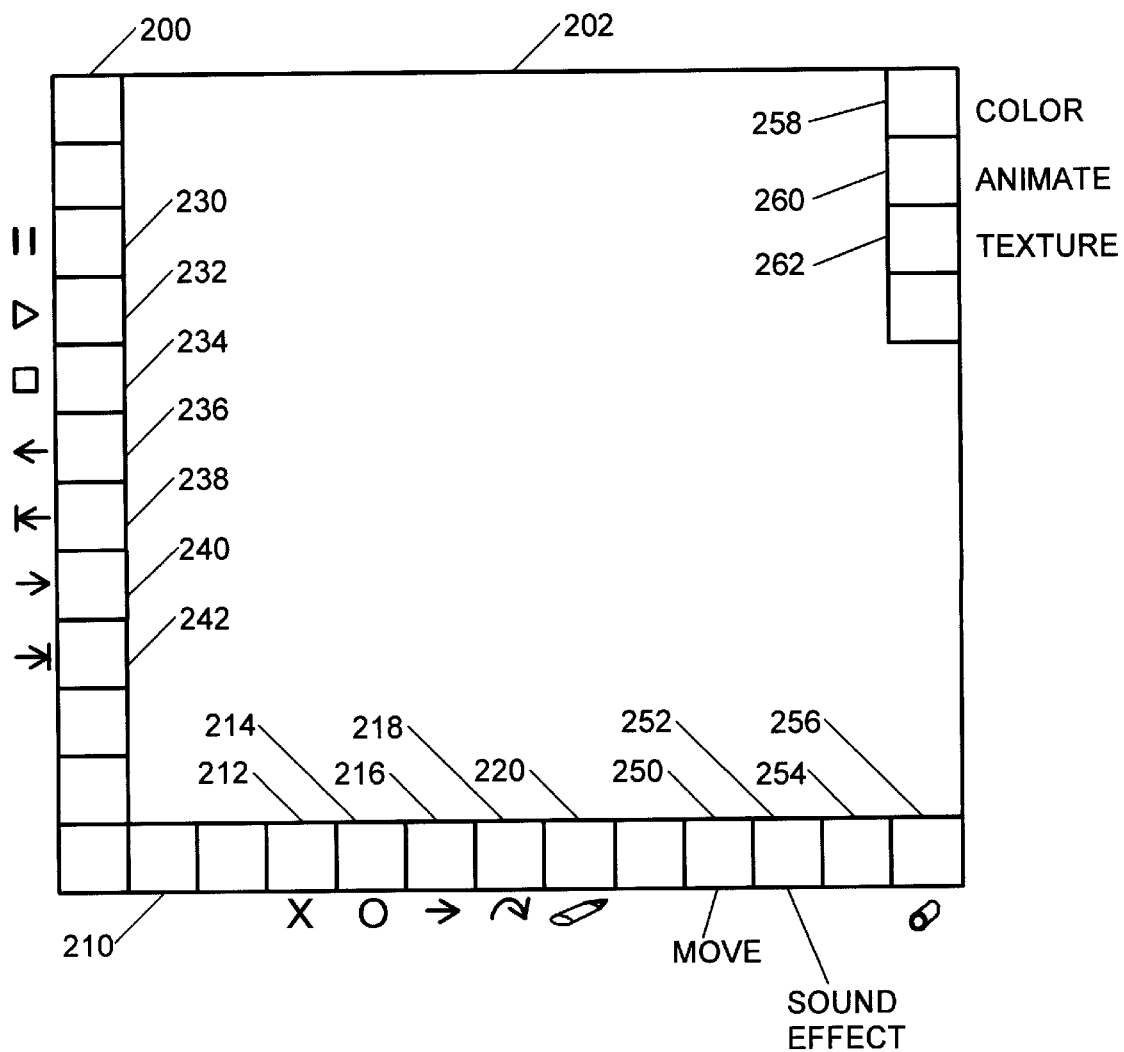
FIG. 2 is a diagram illustrating a touch screen used as an input device in one embodiment of the present invention.

FIG. 2 is a diagram illustrating a touch screen 202 used as an input device in one embodiment of the present invention. A set of vertical invisi-buttons 200 are provided along the left side of the display. They are referred to as invisi-buttons because, in this embodiment, they do not show up on the screen which is displaying a video image as broadcast to a viewing audience. Instead, labels for the invisi-buttons are provided on the bezel of the monitor so that the user knows where the buttons are. In other embodiments, the invisi-buttons are shown on the screen to the user but are not broadcast over the air. A set of horizontal invisi-buttons 210 are provided across the bottom of screen 202.

In the embodiments shown, drawing objects, called glyphs are shown on the set of horizontal invisi-buttons 210. The glyphs shown include an X 212, an O 214, an arrow 216, a curved arrow 218, and a freehand drawing icon 220. These represent drawing objects which may be selected and placed on the screen as desired by the user. Generally, these glyphs can be selected and displayed in real time by the user or stored in a memory and played back in synchronization with a later video play back. Each button such as button X 212 may either represent a static image which is placed on the display in an instant or may represent an animated drawing of the image. For example, if button 212 represent the animation of an X, then the selection of button 212 and the selection of a location on the screen will cause the X to appear on the screen over a period of time as if it is being drawn. The geometry used to draw the stroke can also be varied slightly each time to give a natural variation in look. Buttons also represent animations such as running figures which may also be inserted to enhance video. The animation inserted changes its appearance as a function of its position, of time, or of both position and time.

The glyph menu is an improvement over prior art telestrators which only provide freehand drawing. The glyphs are preferably provided on an invisi-button menu. The invisi-button menu is provided by defining areas on a touchscreen that represent input without providing an altered display in the invisi-button areas. In other embodiments, separate buttons are used or a separate screen is used from the screen that provides video playback. Pop up displays such as slider bars that are shown on the screen of an input interface but are not added to the broadcast are also provided in certain embodiments. The glyph menu provides readily available icons which may be popped onto a display or animated so that they appear to be drawn, thus enhancing the aesthetic appearance of the display and enabling the user to draw more quickly and accurately. In addition, video playback can be controlled so that the user can step forward and backward through the video display and create video enhancements or graphics that can be played back with the video.

In the embodiments shown, vertical invisi-buttons 200 include video play back commands. These include a pause button 230; a play button 232; a stop button 234; a rewind button 236; a step back button 238; a fast forward button 240; and a step forward button 242. These buttons can be used to advance or reverse a graphics animation either frame by frame or by preset or selected time increments. In different embodiments, the graphics animation playback controls the videotape playback or the videotape playback controls the graphics animation playback, or each is controlled separately. Graphic effects such as those selected from horizontal invisi-buttons 210 can then be added to the image displayed according to the controls on vertical invisi-buttons 200.

Other types of objects are also included along horizontal invisi-buttons 210 in some embodiments. For example, a move button 250 and a sound effect button 252 are included in certain embodiments. A three-dimensional object such as a three-dimensional zero shown on a button 256 is also included in some embodiments.

The interface as shown enables a user to create graphics for a video display which are more detailed and more visually appealing than graphics generated using a telestrator. The X's and O's, for example, will appear as straight and properly proportioned figures. Since they can be animated, the illusion can be provided that a user is actually drawing the symbols on the screen as video play back occurs. As will be described below, even when freehand drawing button 220 is selected and a user draws freehand inside screen 202, filtering and texturing is used to enhance the appearance of the graphics generated.

A set of attribute invisi-buttons is shown along the right side of screen 202. These include a color button 258, an animate and a texture button 262. These buttons are used to change the attributes of symbols or lines which are being added to the display or of existing objects that are selected to be changed. Thus, a complete interface is provided to the user that includes controls for video playback, predefined objects that may be added to the screen, and attributes that may be assigned to objects being created. The selection of a drawing symbol such as an X or an O or freehand drawing causes the creation of an object in a video enhancement data base. Each object in the video enhancement database contains information about how the object is to be drawn in each video frame. For each frame of graphics animation, every video object is checked and drawn according to the information contained in the object. In an alternative embodiment, graphics animation changes are accumulated in a single buffer so that the a complete redraw does not occur for every frame.

Figure 3:
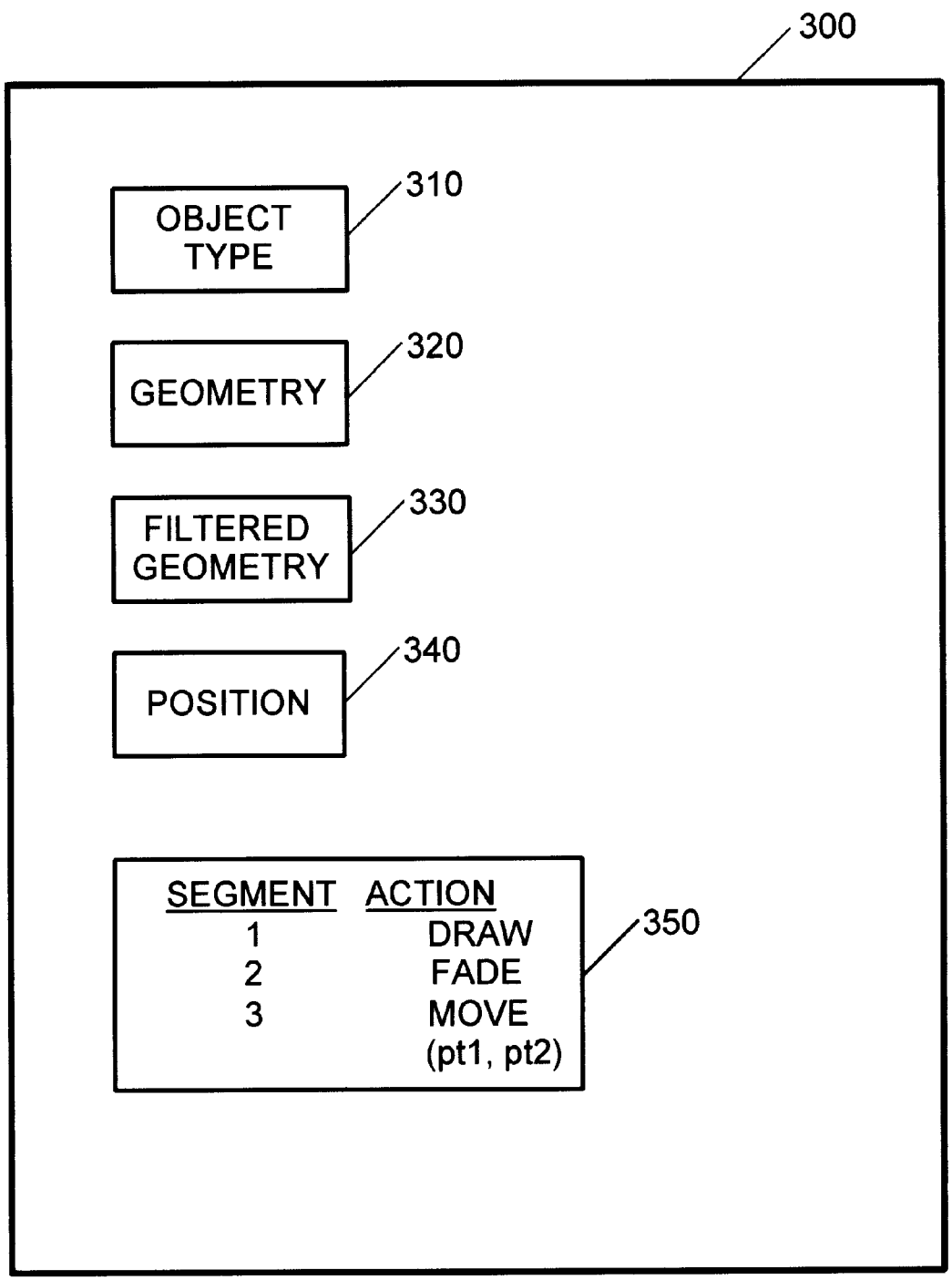
FIG. 3 is a block diagram illustrating the data structure within a video enhancement object contained in the video enhancement database.

FIG. 3 is a block diagram illustrating the data structure within a video enhancement object 300 contained in the video enhancement database. Object type 310 defines the type of object presented by a video enhancement object 300. Object types include predefined shapes and symbols such as X's and O's; custom sets of polygons such as triangles, the collection of which define a composite shape; and sets of points which may be bit mapped directly to the display. Text is another type of object which may be created. Text can be entered by typing at a keyboard, selecting from a list of pre-defined words or phrases, picking letters on a virtual keyboard on the screen, using a stroke recognition system such as Pilot Graffiti, etc., and then displayed by clicking on a position on the screen. The text can be nicely typeset in a predefined font, size, and appearance and can be animated to appear that it is being hand lettered or typed one letter at a time. If hand lettering is simulated, the text is drawn onto the screen using a stroke-based description of a font. Each object may be recorded, undone, edited, stored in macro's, played at different speeds or in parallel, or synchronized to sound or video playback.

A geometry data block 320 is also stored in video enhancement object 300. In some embodiments, a geometry data block 320 includes a list of 2 or three-dimensional points which combined together define the shape and size of an object. As will be described later, these points may be input raw into a video enhancement object 300 or filtered during the input process. If the points represent unfiltered data, then filtering of the points may be specified at some time after the creation of the object. In some embodiments, a filtered geometry data block 330 includes filtered points that may be created as desired. Thus, raw user input points can be stored in the object and enhancements of those points may be selected at any time. A position data block 340 locates the position of the object on the screen. In some embodiments, the information contained in position data block 340 may be included in geometry data block 320 or filtered geometry data block 330.

It should be noted that a geometry data block 320 and a filtered geometry data block 330 enable the storage of video enhancement information either in the form of bit mapped points or polygonal shapes. Filtering of the raw object geometry, as described below, allows smoothing or texture to be added to a video enhancement object 300 either during the input process or during an editing process. In some embodiments, polygons are constructed from the filtered drawing path, typically ribbons of triangles such as may be drawn using graphics accelerators or standard libraries to create anti-aliased strokes suitable for use on television. Polygon strips allow texture to be mapped onto the stroke , such as simulated crayon or brush strokes textures. Rather than necessarily drawing an opaque line, the geometry can be used to draw transparent lines, or a matte signal only used to mix two video images. The geometry can also used to select an area of the video to capture, modify, or use as a reference for creating graphics. Construction of polygon strips also allows for simple parametric control of stroke width. Width may be determined as a function of drawing speed, distance into curve, proximity to other elements in the scene, etc.

Enhancement object 300 also includes animation information about the object. For added visual interest, the strokes which make up the object may be animated after they are initially drawn, e.g. the stroke may widen to give the impression of ink bleeding into a page, or the center of the stroke may move, giving the impression of settling into place, or the stroke may continue to undulate or quiver to give an added excitement to the graphic. In addition, the rough strokes, filtered strokes, or constructed geometry may be recorded, allowing strokes to be undone, repositioned, or edited for the purpose of changing the strokes. Strokes may be replayed, either at their original drawn speed, sped up or slowed down, at some computed rate such as a constant speed on the page. Several strokes may also be animated to appear simultaneously. As mentioned above, strokes can be created in advance of their use on-air and stored as objects available on a touch screen menu, so that each stroke can be drawn at the push of a button. Very complex illustrations can be drawn in advance, edited until they are correct, and then recreated when desired.

An animation event data block 350 defines how the strokes of object 300 are to be drawn during different segments. As will be described below, segments are units of time during which certain drawing actions are defined to occur. The organization of animation event into segments facilitates the fast creation of animation and the synchronization of different object movements. The time interval associated with segments may be directly linked to video play back so that the definition of the segments and the actions during creation of video enhancement objects enables animation events to be synchronized with video play back. In the illustration shown, several actions are shown for the objects occurring during different segments. During segment 1, the object is drawn. Drawing the object is an animation event that takes an amount of time which may be predefined by the system or defined by the user. In one embodiment, a symbol such as an X is predefined to be drawn on the screen during a time interval of approximately half a second. During a segment 2, the object is animated to appear to fade. During a segment 3, the object moves from a first point to a second point. Other object actions include fading on, popping on, flashing, and highlighting. The definition of animation events in this segment by segment fashion enables the object to be animated and undergo changes according to a specific timeline.

Figure 4:
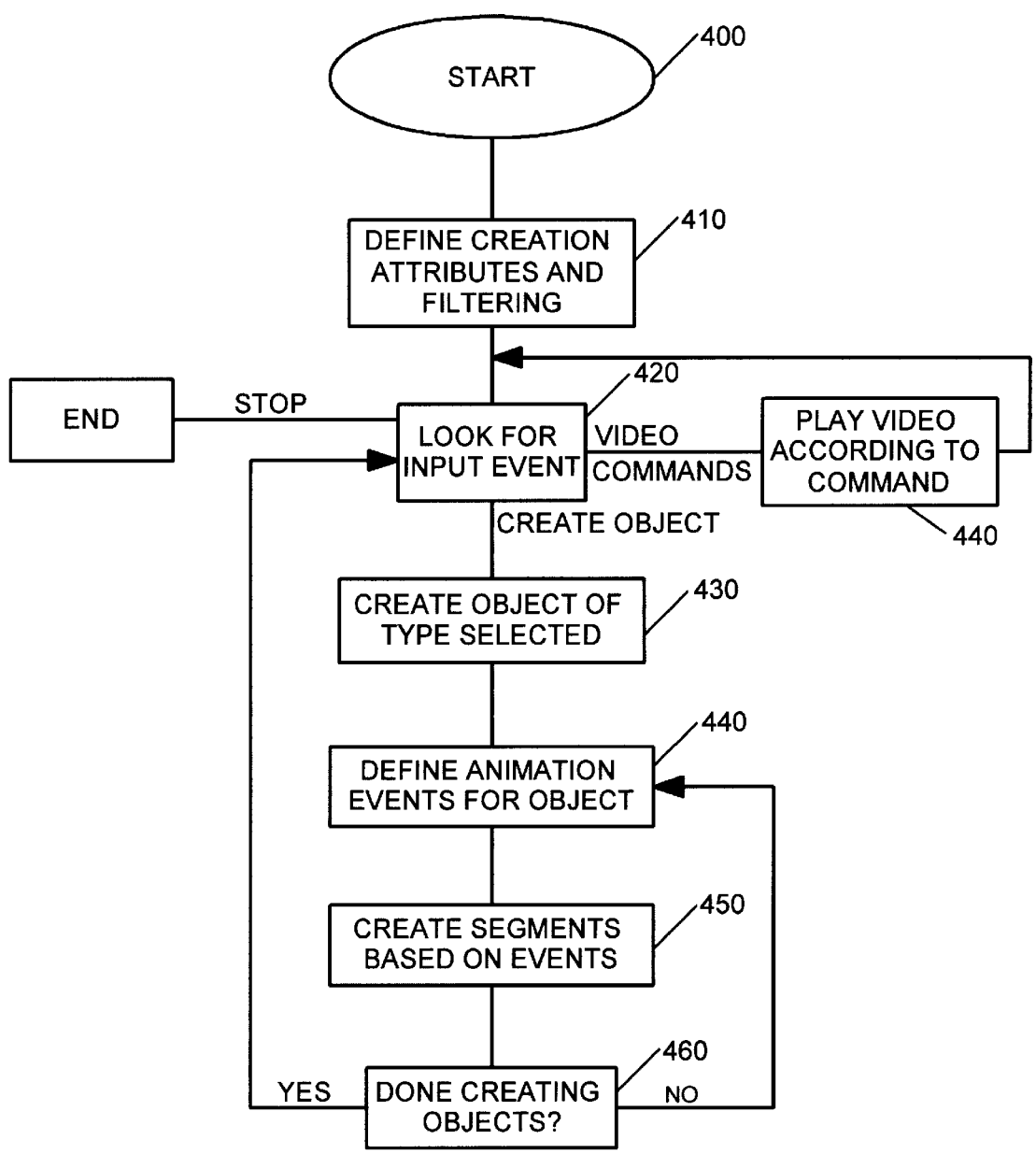
FIG. 4 is a process flow diagram illustrating a process for creating objects.

FIG. 4 is a process flow diagram illustrating a process for creating objects. The process starts at 400. In a step 410, the user defines various object creation attributes and filtering. Creation attributes may be color, or animation attributes such as length of draw time, instantaneous draw for objects which pop on the screen complete, or a fade time for objects which fade on or off. Filtering objects, as described below, enables objects which are drawn in a rough or uneven manner to be smoothed in appearance. In addition, filtering allows objects which are drawn at an uneven rate of speed to be reanimated so that the drawing rate conforms to a desired profile.

Control is then transferred to a step 420 and the processor looks for an input event. If the event is a stop command then the process ends at 430. If the event is a video command for play back, rewind, step forward or step back, then control is transferred to a step 440 and video play back is run according to the command. Video commands may be entered by pressing an invisi-button that controls video play back on the edge of the screen. In certain embodiments, video commands can be entered at any time including during the creation of an object. While video play back is occurring, control is transferred back to step 420 and the processor continues to look for input events.

When an input event occurs that corresponds to the creation of an object, control is transferred to a step 430, where an object of the type selected is created. Objects which may be created include predefined animated objects such as X's which are drawn on during a specific interval of time, other defined graphic symbols which are not animated, or enabled freehand drawing. Certain objects such as arrows, may be created in steps. Strokes and shapes can be created procedurally, for example by clicking on two points in the scene to create an arrow which instantly appears or animates on to give the impression of being drawn by hand. A curved line can be created by placing several points, moving them while interactively viewing the resulting shape, and then drawing the final graphic when the editing is complete. A three point arrow, for example, is created by selecting the three point arrow object and selecting three points which define the arrow. When an object such as a three point arrow is created, the processor checks for events corresponding to the selection of points once the object is selected. In addition to defining the physical geometry of the object at the time of object creation, the relative time of creation or time corresponding to the video playback is defined as well.

Next, in a step 440, animation events are defined for the object. These can include fading in, fading out or moving. As animation events are created, segments based on the events are created in a step 450. In general, more than one object can be animated during a given segment so that object movements are synchronized with the video display. Next, in a step 460, it is determined whether the user is finished creating objects. If the user is finished, then control is transferred to step 420. If the user is not finished, then control is transferred to step 440.

As shown above, objects are created during video play back. Video play back is controlled using video commands. Thus, the user can find points in the video where video enhancements are desired to be made and create objects at those points. Animation events, such as moving the object can also be defined in connection with the video play back. For example, if an announcer is diagramming a football play, a wide receiver might be represented by a circle and a quarterback might be represented by a square with the ball being represented by a dot. The announcer could first create the circle representing the wide receiver at the beginning of the play and then step the video forward until the point that the receiver catches the ball. At that point, the user could specify that location of the receiver and use the move command to specify that the receiver should move in an animated fashion between the two points. Alternatively, the user could drag the receiver from the first location to the second location while the video is playing, tracing the path taken by the receiver. The user could also specify multiple points along the receiver's path and specify that the circle representing the receiver should be animated between the points.

Each movement of the receiver would be a segment. During animation generation as described below, other objects could be animated during the segment in which the receiver is moving. Assuming that the user animates the receiver by dragging the circle along the path taken by the receiver thus creating a single segment, the creation of the remainder of the animation proceeds as follows. The user steps back to the beginning of the segment where the receiver started moving and defines the motion of the quarterback represented by the square. Again, this may be done by dragging the square across the path taken by the quarterback while playing the video image. Once this is done, the video is stepped back to the beginning of the segment and a dot representing the ball is drawn at the point where the quarterback throws the ball towards the receiver. Next, the video is played forward to the point where the receiver catches the ball and the ball is moved to that point using the move command. An animation of the ball moving between the quarterback and the receiver is automatically created.

Thus, it is possible to trace the action of the play on video using the objects and generate a visually pleasing, synchronized diagram of the play. The circle representing the receiver can be drawn in an animated fashion so that it appears that the announcer is drawing a circle and then the circle follows the path of the receiver during the course of the replay with the video enhancements shown.

Figure 5:
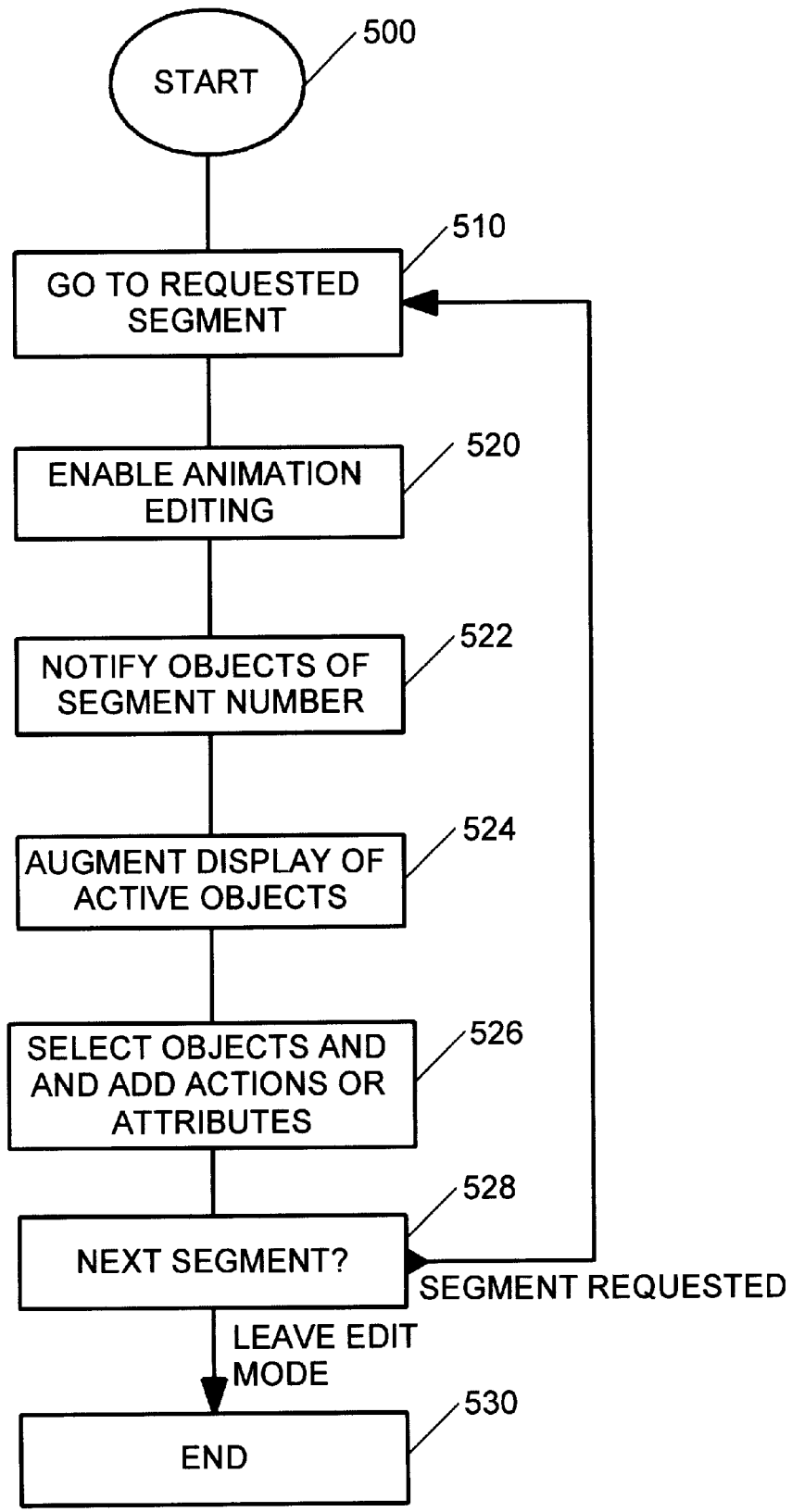
FIG. 5 is a process flow diagram illustrating an editing process implemented in one embodiment of the present invention to facilitated the definition of animated events.

FIG. 5 is a process flow diagram illustrating an editing process implemented in one embodiment of the present invention to facilitated the definition of animated events. The process starts at 500. In a step 510 the animation editor goes to a requested segment. In one embodiment, the segment is requested using the back step or forward step invisi button. Next, in a step 520, the animation editing is enabled. In a step 522, the objects are notified which segment number is active for the animation editing. In a step 524, the display of objects which are active during that segment is augmented. Next, in a step 526, objects are selected and actions or attributes are added to those objects for animation during the selected segment. A number of objects may be modified in step 526. In a step 528, the editor checks whether the user is ready to go on to the next segment. If another segment is requested, then control is transferred to step 510 and if the user requests to leave edit mode, then the process ends at 530. In the example shown, segment selection precedes object selection and attribute modification. In other embodiments, the order of these operations may be changed or some may be skipped. For example, an object may be selected first and modified for all segments, without selecting a specific one segment. The selection of a segment is an important feature of certain embodiments so that the user is able to step backwards and forwards through the segments of the animation and to change objects, move objects or add attributes to objects at different points in the animation.

Figure 6:
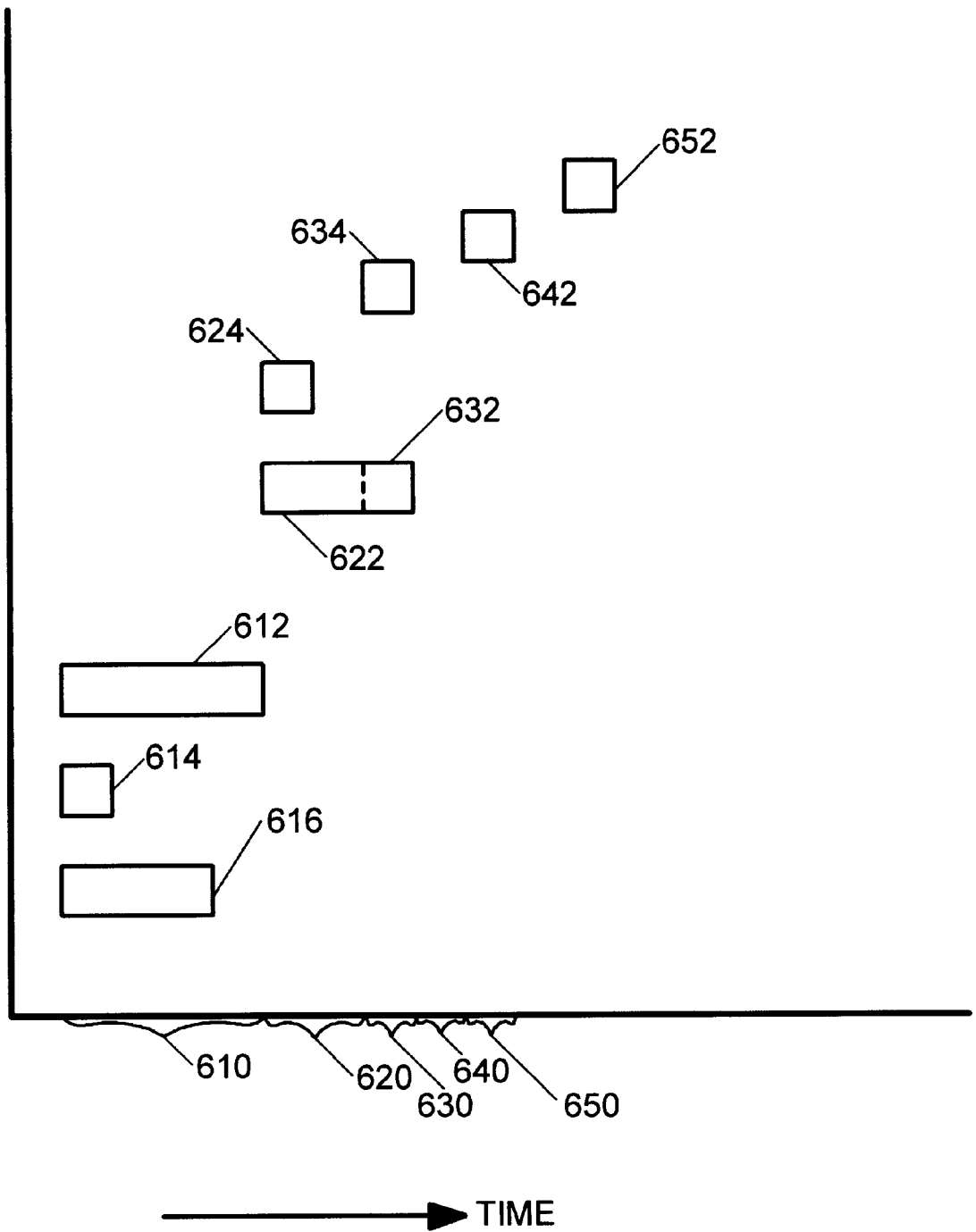
FIG. 6 is a timing diagram illustrating different events that are associated with objects during different segments.

FIG. 6 is a timing diagram illustrating different events that are associated with objects during different segments. A first segments 610 is associated with animation events 612, 614 and 616. Animation events 612, 614 and 616 each begin at the beginning of segment 610. Animation event 614 and 616 each terminate before the end of segment 610 and animation event 612, the longest animation event defines the length of segment 610. An object 622 and an object 624 are animated during a sequence 620. Object animation event 632 is associated with animation event 622. For example, animation events 622 and 632 could represent the uninterrupted motion of a single object. However, the definition of animation event 634 during animation event 622 causes the beginning of a new segment to be generated and event 622 to be divided between two events, one beginning at the beginning of segment 620 and the other beginning at the beginning of segment 630. Preferably, these segments and event separations are generated automatically by the processor so that the user need only specify animation events and the segments are automatically generated. In other embodiments, events can be defined to extend across more than one segment. The segments enable the user to step backwards and forwards among events and to define other events which are synchronized with already created events that start at the beginning of the same segment. Also shown are an animation event 642 appearing during a segment 640 and an animation event 652 occurring during a segment 650.

Figure 7:
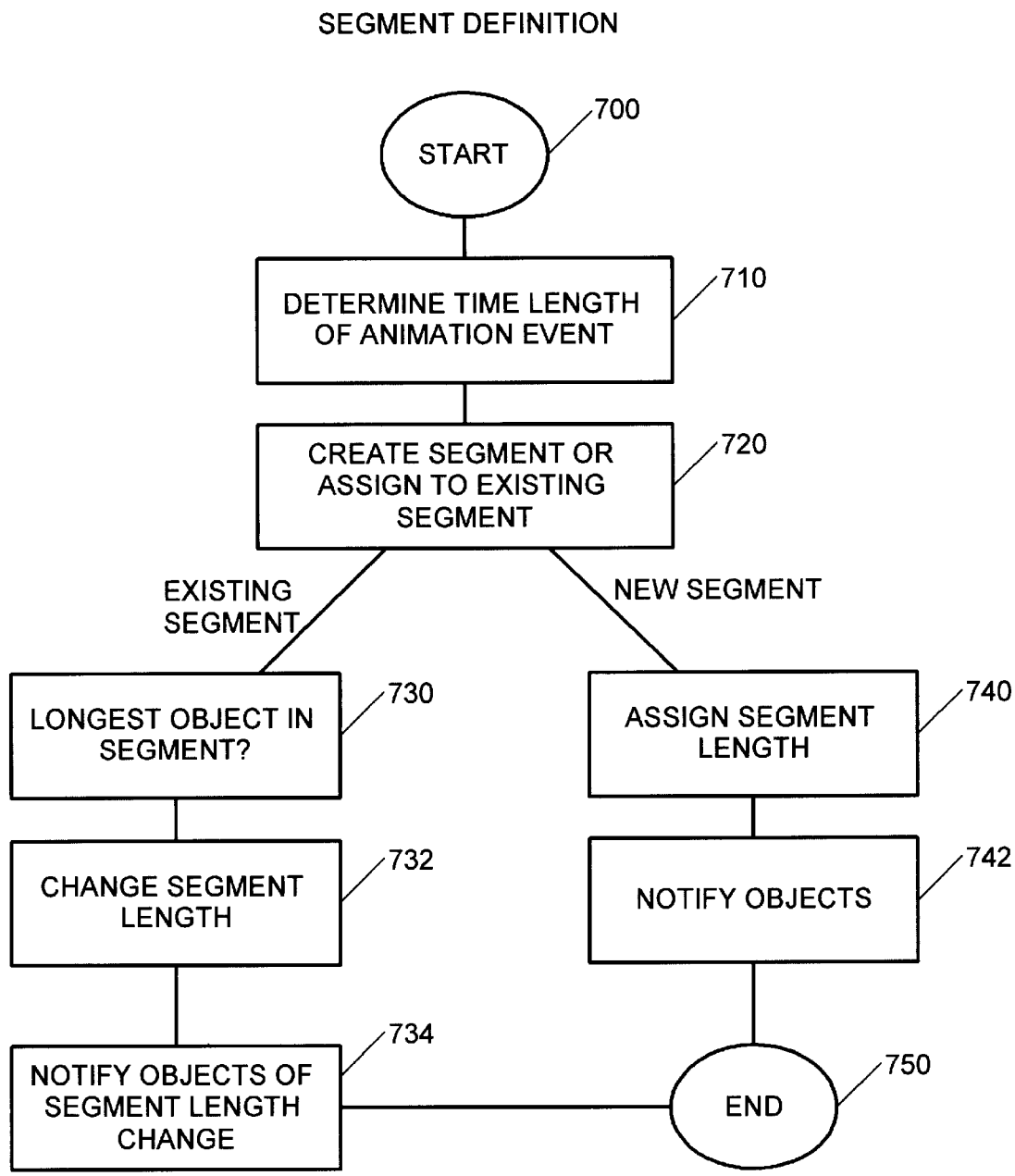
FIG. 7 is a process flow diagram illustrating the definition of a segment.

FIG. 7 is a process flow diagram illustrating the definition of a segment. The process starts at 700. In a step 710, the time length of the animation event is determined. Next, in a step 720, a segment is created or the animation event is assigned to an existing segment if the beginning of the animation event coincides with the beginning of an existing segment. If an existing segment is used then control is transferred to a step 730 and it is checked whether the new animation event is the longest event in the segment. If it is, then control is transferred to a step 732 and the segment length is changed to conform to the length of the new object. Next, in a step 734, the processor notifies all the objects of the segment length change. This may be important, for example, if an animation event is defined within an object that is supposed to occur during the whole of the segment which has changed length. Certain animations occur at different rates and so it is important that the object be able to calculate the rate of animation change within the overall segment length during which the animation occurs. If the object is assigned to a new segment in step 720 then control is transferred to a step 740 and the new segment is assigned a segment length. Next, in a step 742 the objects are notified of the existence of the new segment. Whether an existing segment is used or a new segment is created, the process ends at 750.

Figure 8A:
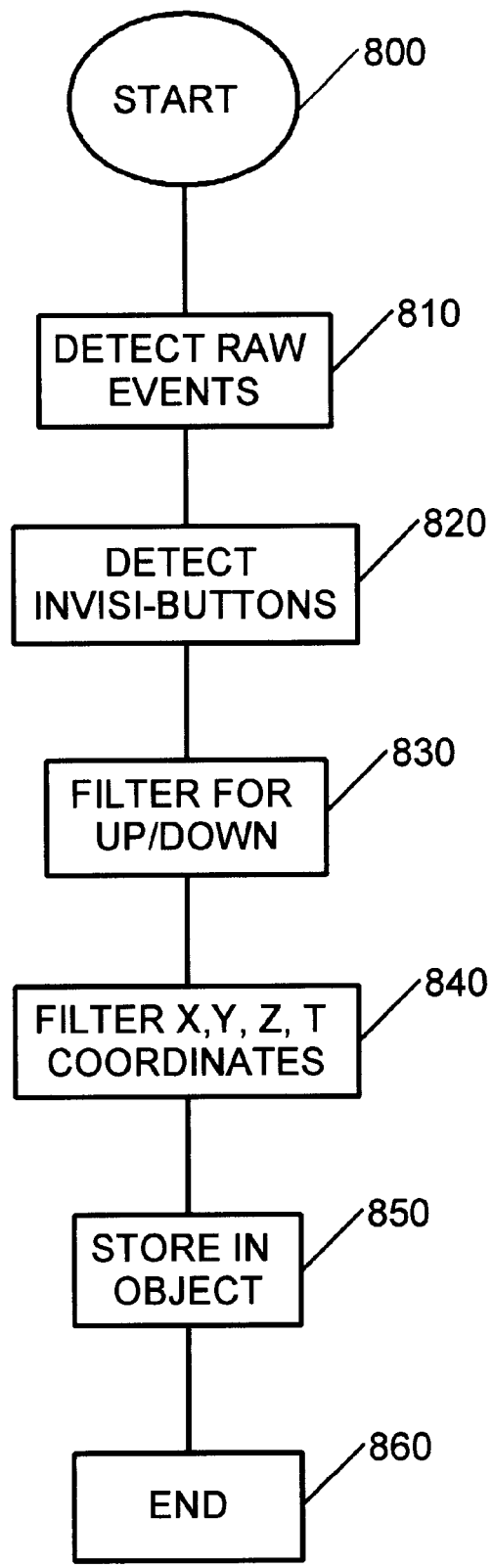
FIG. 8A is process flow diagram illustrating the process for storing a custom drawing object.

FIG. 8A is process flow diagram illustrating the process for storing a custom drawing object. The process begins at 800. In a step 810, the processor detects raw events occurring on the input device, for example, a touch screen. In a step 820, the processor detects the selection of an invisi-button. It should be noted that a state machine as shown in FIG. 8C keeps track of which buttons are selected to facilitated the interpretation of raw events, which are continually monitored by the processor. Next, in a step 830, the processor detects further input, filtering for inadvertent up and down motion. If, for example, the input device is a touch screen, then the user's finger may leave the surface of the screen at different times for a brief instance and return to the screen. It may be undesirable for these breaks to show up as breaks in lines being drawn, and so this inadvertent up down motion is detected and filtered out. Next, in a step 840, filtering of the coordinates of the points detected occurs. The purpose of this filtering is to smooth the points in three spatial dimensions, as well as time. This process is described in FIG. 8b. Next, in a step 850, the filtered coordinates are stored in a video enhancement object and the process ends at 860.

It should be noted that in the above description, filtering is described as occurring during input of the points and before information is stored in an object. This is particularly useful when real time animation is being done. In embodiments where an animation is created off line and then played over the air, it may be desirable to read all data points into the object and then select a filtering method afterwards so that the raw points may be filtered in different ways and the effects of different filtering can be evaluated before a final filtering method is selected. Different filtering techniques are used in various embodiments. Filtering may include dynamic terms, effectively modeling the raw stroke as being connected by a spring to the drawing point. Proportional, integral and differential (PID) control may also be used to smooth or otherwise change the way a drawing stroke is rendered.

Figure 8B:
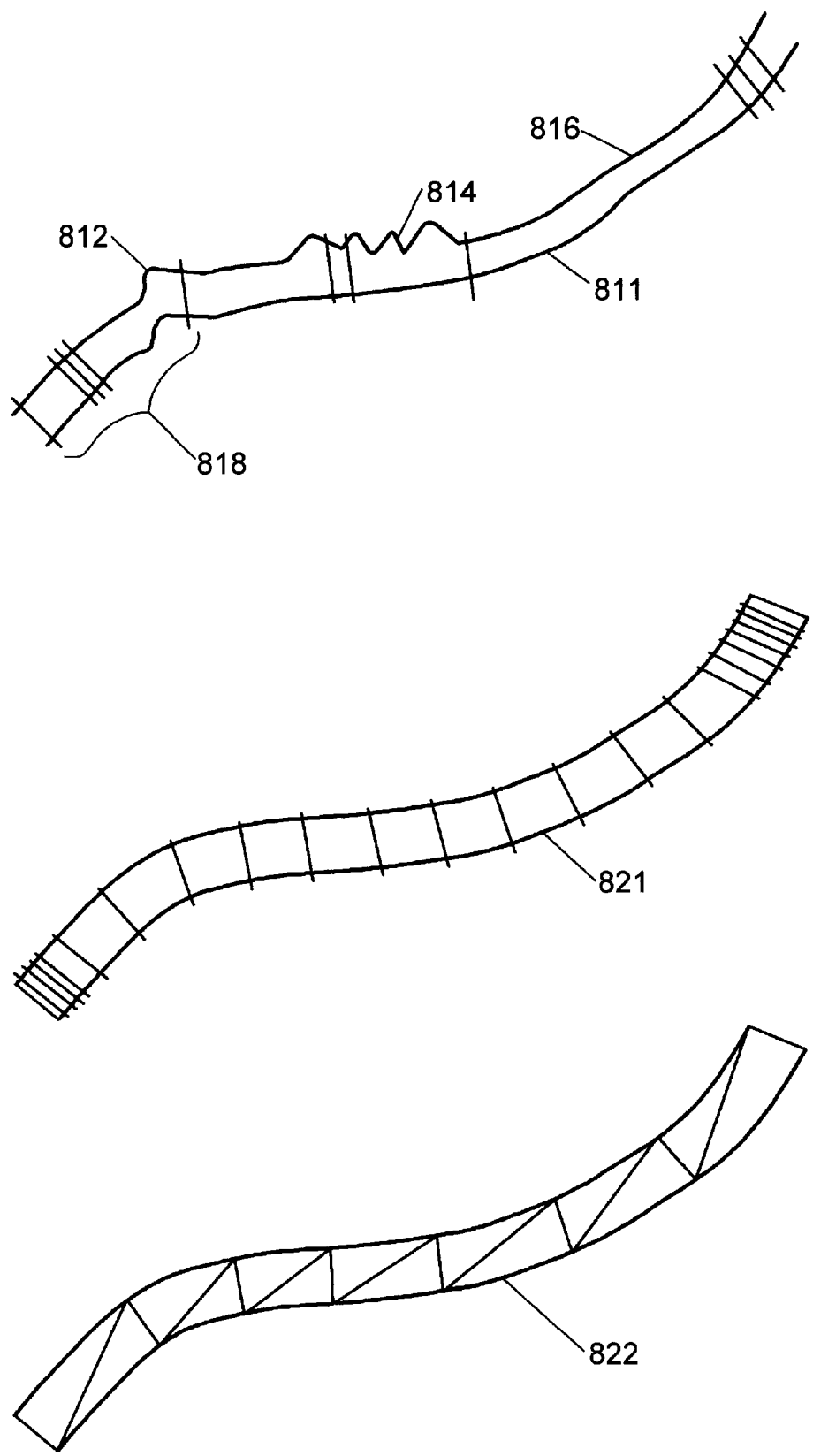
FIG. 8B is a diagram showing a line rendered after being input as raw data and a line rendered after being stored in an object and filtered.
Figure 8C:
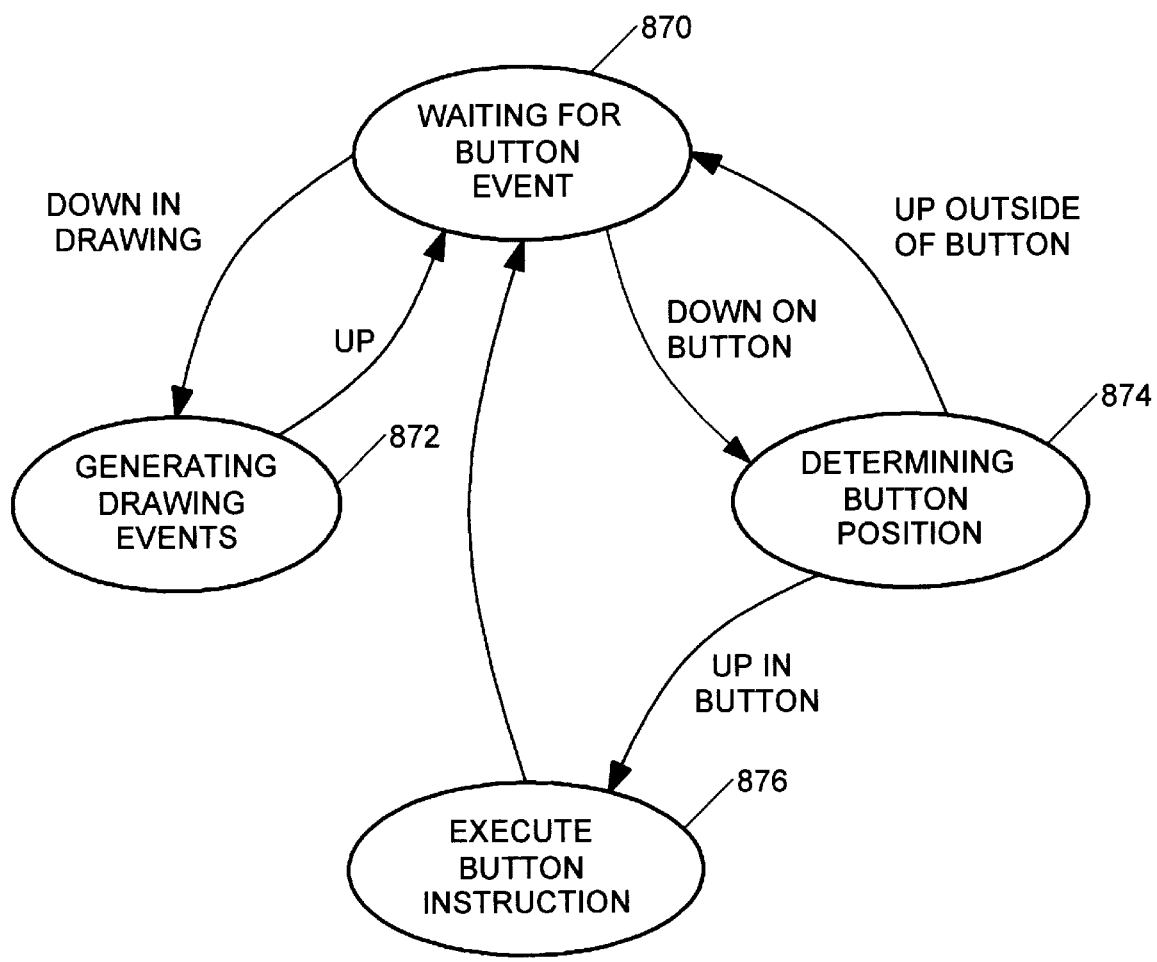
FIG. 8C is a state diagram illustrating how an event processor is used to detect the selection of an invisi-button.

FIG. 8B is a diagram showing a line 811 rendered after being input as raw data and a line 830 rendered after being stored in an object and filtered. Spatially, line 811 contains aliasing 812 which is an artifact of the rendering process as well as a random jagged portion 814 and a variation in line width 816. Variation in line width may be caused, for example, when a pressure sensitive stylus is used for input and jagged portions are possibly caused by inadvertent variations in input. All of these features reduce the quality of line 810. By storing the line as a series of polygons, (generally ribbons of triangles) it is possible to smooth the line and to remove aliasing using standard anti-aliasing techniques. The number of sample points for the line is also preadjusted in certain embodiments so that points are discarded for portions which have too many sampled points and points are interpolated for portions that have too few points.

Since line 811 may be rendered as an animation, the temporal aspects of line 811 can also detract from its appearance. Timelines 818 are intended to show the amount of line 811 that was drawn during equal increments of time. Where the timelines are close together, line 811 was drawn slowly. Where the timelines are further apart, line 811 was drawn quickly. When animated, this jerky stopping and starting drawing motion may be distracting to the viewer. A line 821 is shown which represents the data stored in a video enhancement object based on the input line 811. Line 821 has been filtered spatially to eliminate the jagged edges and undesired line width variation. Line 822 has been filtered temporally so that when it is animated, it is drawn slowly at first with the speed of movement increasing to a constant value and then slowing down towards the end of the drawing of line 820 so that the animation of line 820 appears to have been drawn in smooth, confident stroke. Other animation speed profiles can be defined. If a line is desired to follow a video event such as a player running, then the input line speed is preserved. It should also be noted, that as well as filtering, input lines may also be textured or colored according to attributes specified by the user, as described above. Line 822 illustrates how triangles are used to represent a line in a drawing object. This enables the width of the line to be edited. It also facilitates the use of anti-aliasing techniques so that aliasing caused during rendering is eliminated.

FIG. 8C is a state diagram illustrating how an event processor is used to detect the selection of an invisi-button and to distinguish the selection of an invisi-button from the user drawing on a portion of the screen containing an invisi-button so that selection of an invisi-button may be detected in step 820 of FIG. 8A. The machine begins in a state 870 of waiting for a button event. When input is detected in the drawing, then the machine transitions to a state 872 of generating drawing events. Even if the user wanders into an invisi-button area while the machine is in the state of generating drawing events, the machine will interpret the input from the user as drawing events, not a as the selection of an invisi-button. The machine remains in state 872 until the user picks up his finger or otherwise indicates that drawing event input is finished. Then, the machine transitions back to state 870.

When the user presses down on one of the invisi-buttons while the machine is in state 870, the machine transitions to a state 874 of determining the button position. While the machine is in state 874, if the user picks up his finger outside of the invisi-button area, then the machine transitions back to state 870. If while in state 874, the user picks up his finger inside the button area, then the machine transitions to a state 876 and the button instructions are executed. The machine then transitions back to state 870. Thus, it is possible to determine whether invisi-buttons are being selected or whether drawing is occurring in the area occupied by the invisi-button based on the state of the machine.

Figure 9:
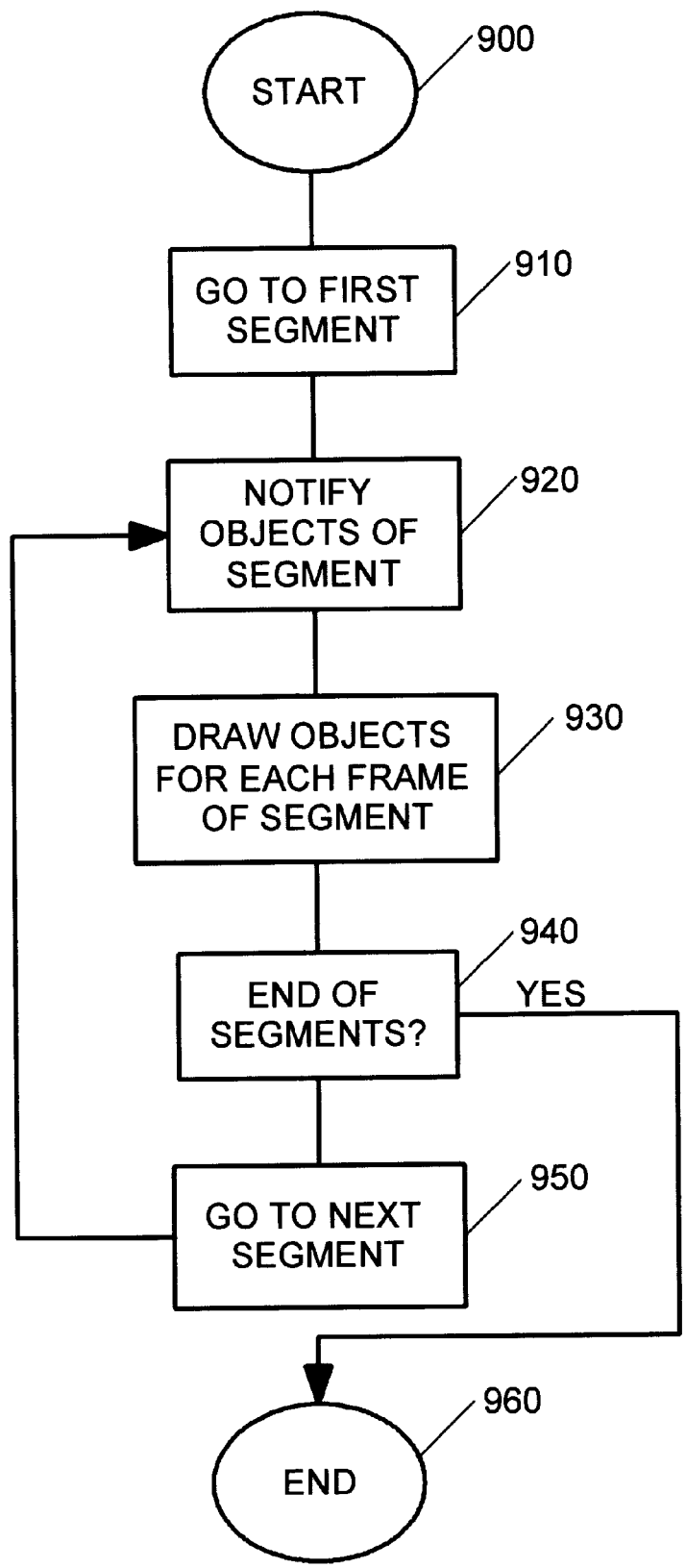
FIG. 9 is a process flow diagram illustrating a process for rendering objects during an animation.

FIG. 9 is a process flow diagram illustrating a process for rendering objects during an animation. The process starts at 900. In a step 910, the processor goes to the first segment. Next, in a step 920, the processor notifies the objects of the segment number. In a step 930, objects are drawn for each frame of the segment, according to the behaviors defined in the objects. The processor checks at the end of each segment to determine whether the last segment has been animated in a step 940. If the segments are finished, then the process ends at 960. If the last segment has not been reached, then control is transferred to a step 950 and the processor goes on to the next segment and Control is then transferred back to step 920. It should be noted that at any point in stepping through the segments, a pause may be requested by the user so that the process waits to resume. Pauses are also included in certain embodiments as part of the animation design so that the animation automatically pauses at a certain point and waits for a command to resume. Thus, for each segment, the objects are notified so that the objects defined to appear or to be animated during that segment may be rendered. As noted above, it is preferred that each object that is active during a frame of a segment is redrawn for every frame. In other embodiments, a single buffer is used and unchanged objects are not redrawn every frame.

Figure 10A:
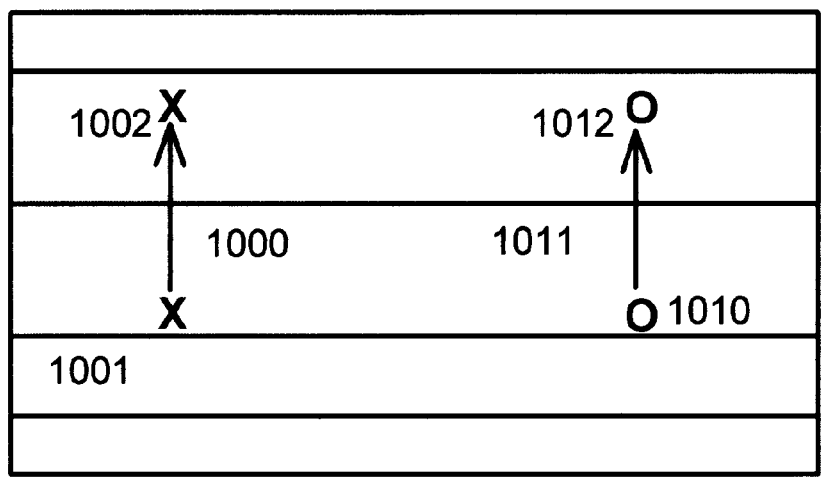
FIGS. 10A and 10B are diagrams illustrating how three-dimensional objects are defined in one embodiment at one camera angle and then the objects are displayed at a different camera angle.
Figure 10B:
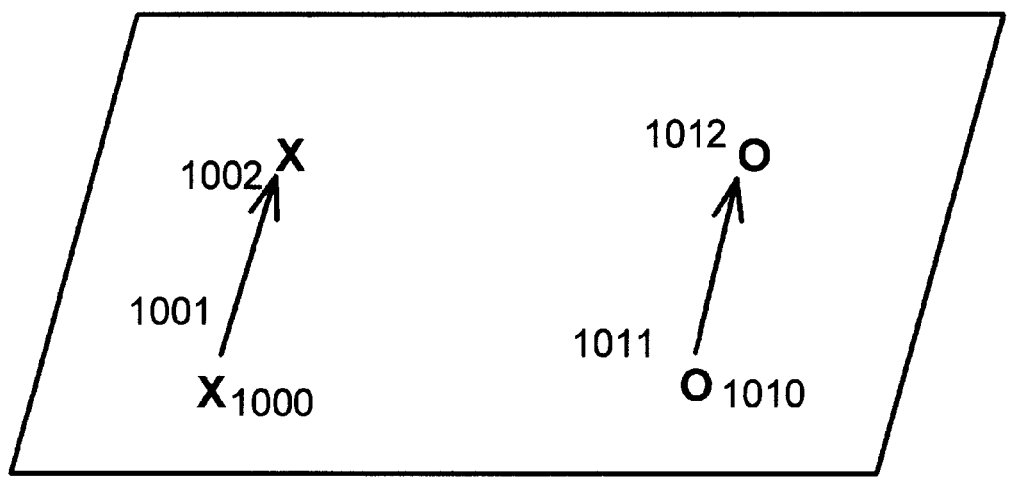

FIGS. 10A and 10B are diagrams illustrating how three-dimensional objects are defined in one embodiment at one camera angle and then the objects are displayed at a different camera angle. In the example shown, an X object 1000 and an O object 1010 are each shown animated during a segment with X object 1000 moving from a first position 1001 to a second position 1002. Likewise, O object 1010 moves from a first position 1011 to a second position 1012.

Each of the positions are defined in 3 dimensions. If, as shown, the camera shot in FIG. 10*a* is taken to be directly above a playing field, then the animation object can be defined as projected onto the field which is defined as a plane or the animation object may be defined as floating a certain known distance above the known level of the playing field. Generally, the animation object may be projected onto any 3D surface. Thus the objects are three-dimensional objects located in a three-dimensional space. When the camera angle changes, as shown in FIG. 10B, the paths defined for objects 1000 and 1010 in three-dimensional space in FIG. 10A appear as shown in FIG. 10B. Because of the oblique angle of the camera, the movement of object 1000, for example, from position 1001 to position 1002 appears to occur at an oblique angle as shown. Likewise, the motion of object 1010 from position 1011 to position 1012 also appears to occur at an oblique angle.

The position of the camera is determined either by means of encoders on the camera or by registering the position of the camera from the video information observed by the camera. In some embodiments, a virtual camera is defined. The three-dimensional coordinates of the video enhancement objects 1000 and 1010 are translated to the three-dimensional coordinates in the camera's frame of reference in FIG. 10B. Thus, an animation that is defined in a view such as is shown in FIG. 10A is can be translated according to a new camera angle. As the camera angle changes, perhaps even during the course of a video clip shown along with the animation, the coordinates of the animated objects are transformed so that the objects move properly in whatever camera view is shown.

Thus, graphical elements may be drawn onto a virtual surface which can be moved or animated in 2D or 3D, that is either scaled or slid around on the screen, or tumbled, viewed in perspective, warped, etc. For example a basketball play can be diagrammed on the surface of a court, then the court can be moved in perspective to view the diagram from different angles. In certain embodiments, the motion of the graphics is driven by measured motion of the camera capturing a real environment, making the graphics appear to stick to the real scene.

It has been shown that real time or near real time graphical enhancements may be provided to video output from a video camera or a videotape player. In other embodiments, the enhancement techniques described are applied to other systems such as three dimensional computer animation systems where enhancements are provided digitally to a virtual computer generated scene within the animation instead of combined with a video output.

An apparatus and method for creating live or nearly live video enhancements has been described. An interface that facilitates graphic generation over video and animation has been disclosed. Because of its performance advantages in live situations, the present invention is useful in news, weather, or sports broadcasts. The present invention is also useful for off-line video production because it is quick and intuitive.

Although the foregoing invention has been described in some detail for purposes of clarity of understanding, it will be apparent that certain changes and modifications may be practiced within the scope of the appended claims. It should be noted that there are may alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of providing a sequence of animated enhancements to a video image comprising:

displaying a sequence of video images on a video display, the images being created from a first camera viewpoint;

providing in connection with the display a set of glyphs wherein the glyphs include predefined graphical images suitable for enhancing the video display;

selecting a glyph that is to be combined with sequence of video images;

defining a plurality of points in the sequence of images such that the points are associated with a plurality of locations of the glyph;

generating a video output containing graphical output information determined by the selected glyph, the glyph being projected onto a 3D surface that is viewed from a second camera viewpoint, and wherein the relative screen location of the graphical output information is determined by the location of the glyph as viewed from the second camera viewpoint;

whereby the video output is generated according to the second camera's view of the glyphs which are inserted according to the sequence of video images and which move in connection with the sequence of video images according to the specified plurality of glyph locations.

2. A method of providing a sequence of animated enhancements to a video image comprising:

displaying a sequence of video images on a video display;

providing in connection with the display a set of glyphs wherein the glyphs include predefined graphical images suitable for enhancing the video display;

selecting a glyph that is to be combined with sequence of video images;

defining a plurality of points in the sequence of images such that the points are associated with a plurality of locations of the glyph;

generating a video output containing graphical output information determined by the selected glyph, the relative screen location of the graphical output information being determined by the location of the glyph; and defining a relative time for the display of the glyph in a specified location according to a time sequence parameter provided by videotaped sequence;

whereby the video output is generated according to the glyphs which are inserted according to the sequence of video images and which move in connection with the sequence of video images according to the specified plurality of glyph locations.

3. A method as described in claim 2 further including changing the relative time for the display of the glyph according to a desired time profile.

4. A method as described in claim 3 wherein the desired time profile includes an accelerating period wherein the rate of drawings speeds up, a constant period wherein the rate of drawing is substantially uniform, and a decelerating period within the rate of drawing slows down.

5. A method as described in claim 3 wherein the desired time profile is smoothed to eliminate uneven drawing pauses.

6. A method of providing a sequence of animated enhancements to a video image comprising:

displaying a sequence of video images on a video display;

providing in connection with the display a set of glyphs wherein the glyphs include predefined graphical images suitable for enhancing the video display;

selecting a glyph that is to be combined with sequence of video images;

defining a plurality of points in the sequence of images such that the points are associated with a plurality of locations of the glyph;

generating a video output containing graphical output information determined by the selected glyph, the relative screen location of the graphical output information being determined by the location of the glyph; and stepping forward or backward within the sequence of animated enhancements according to a selected segment, the segment being defined by a glyph event;

whereby the video output is generated according to the glyphs which are inserted according to the sequence of video images and which move in connection with the sequence of video images according to the specified plurality of glyph locations.

7. A method as described in claim 6 further including:

defining a plurality of glyph events occurring during a single segment and defining the length of the segment according to the length of the longest glyph event.

8. A method of providing enhancements to a video image comprising:

displaying a sequence of video images on a video display;

providing in connection with the display a set of glyphs including a freehand glyph that conforms to a user specified path, the freehand glyph being stored as a series of polygons, wherein the glyphs include pre-defined graphical images suitable for enhancing the video display;

selecting a glyph that is to be combined with the sequence of video images;

defining an insertion point for the glyph on the video display;

filtering input entered by a user in connection with the freehand glyph to smooth the video output; and generating a video output containing graphical output information determined by the selected glyph, the relative screen location of the graphical output information being determined by the insertion point of the glyph;

whereby the video output is generated according to the glyphs which are inserted in connection with the sequence of video images.

* * * * *